United States Patent
Suzuki et al.

(10) Patent No.: US 6,761,084 B2
(45) Date of Patent: Jul. 13, 2004

(54) SHIFT LEVER DEVICE

(75) Inventors: Yutaka Suzuki, Aichi-ken (JP); Keizo Fukuda, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 319 days.

(21) Appl. No.: 09/789,737

(22) Filed: Feb. 22, 2001

(65) Prior Publication Data

US 2001/0027891 A1 Oct. 11, 2001

(30) Foreign Application Priority Data

Mar. 7, 2000 (JP) .......................................... 2000-062655

(51) Int. Cl.[7] .............................................. B60K 20/00
(52) U.S. Cl. ................................ 74/473.33; 74/473.18; 74/473.21
(58) Field of Search ........................ 74/473.33, 473.18, 74/473.21, 473.24, 473.25

(56) References Cited

U.S. PATENT DOCUMENTS

| 5,156,060 | A | | 10/1992 | Shirahama et al. |
| 5,852,953 | A | * | 12/1998 | Ersoy ....................... 74/473.12 |
| 6,192,770 | B1 | * | 2/2001 | Miyoshi et al. ........... 74/473.18 |
| 6,371,886 | B1 | * | 4/2002 | Sawa et al. ................. 477/115 |
| 2002/0166400 | A1 | * | 11/2002 | Syamoto et al. .......... 74/473.21 |
| 2003/0098218 | A1 | * | 5/2003 | Syamoto ................... 192/220.4 |

* cited by examiner

Primary Examiner—David Fenstermacher
(74) Attorney, Agent, or Firm—Nixon Peabody, LLP (57) ABSTRACT

A gate-type shift lever device in which a pin is formed at a mounting piece formed at a back wall portion of a base, which pin axially supports a plate switch. Two levers are formed at the plate switch. A shift lever abuts and presses one of the levers during a shift operation from a "D" position to a "4" position. The shift lever abuts and presses another of the levers, during a shift operation from a "2" position to an "L" position. In accordance with rotation of the plate switch due to the pressing forces received by the levers, a holder contact moves transversely. Thus, the shift operations from the "D" position to the "4" position and from the "2" position to the "L" position can be detected.

28 Claims, 10 Drawing Sheets

SHIFT LEVER DEVICE

BACKGROUND OF THE INVENTION

1. Field of the Invention

The present invention relates to a shift lever device for operating a transmission of a vehicle.

2. Description of the Related Art

As an operation device for changing shift ranges set in an automatic transmission of a vehicle by operating automatic transmission of the vehicle from within the vehicle, there has been generally used a shift lever device which has a bar-shaped shift lever and which operates the automatic transmission by pivot-operating the shift lever.

Among such shift lever devices, there is a so-called straight-type shift lever device in which a shift lever is pivot-operated (linearly operated as seen from above) only about an axis whose direction corresponds substantially to the vehicle transverse direction. Other than the straight-type shift lever device, there is also provided a so-called gate-type shift lever device in which a shift lever is pivot-operated in a zigzag pattern about an axis which corresponds substantially to the vehicle transverse direction and about an axis which corresponds substantially to the vehicle longitudinal direction.

In this gate-type shift lever device, as described above, the shift lever is operated in a zigzag pattern. Thus the shift lever of the gate-type shift lever device can be operated for a longer distance as seen from above, in a range for disposing the shift lever device which range is as large as or shorter than that of the straight-type shift lever device, in which the shift lever is linearly operated as seen from above. Accordingly, an automatic transmission which uses the gate-type shift lever device has an advantage that more shift ranges can be set in the automatic transmission which uses the straight-type shift lever device.

Figure 10:
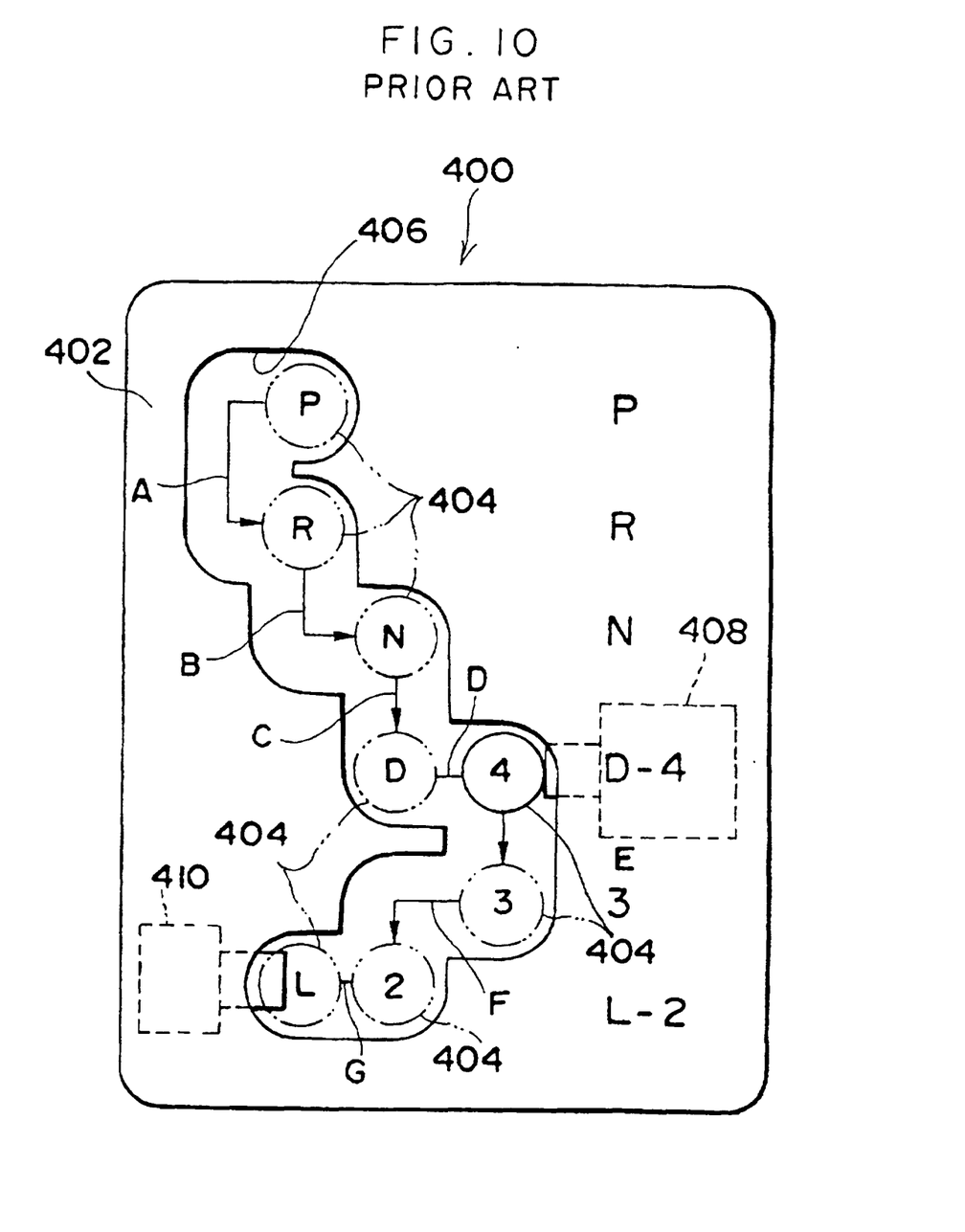
FIG. 10 is a schematic plan view of a conventional shift lever device.

FIG. 10 is a plan view of an example of a housing 402 used in a gate-type shift lever device 400. The housing 402 is a molded product which is integrally molded from, for example, a synthetic resin material. The housing 402 is usually formed in a plate shape or in a box shape so as to open substantially toward the vehicle downward side. Further, the housing 402 is disposed between a driver's seat and a front passenger's seat such that a main surface thereof faces substantially in the vehicle upward direction. A shift hole 406, through which a bar-shaped shift lever 404 whose longitudinal direction is substantially along the vehicle vertical direction passes, is formed in the main surface of the housing 402. The shift hole 406 is a zigzag substantially along the vehicle longitudinal direction and the vehicle transverse direction. The shift lever 404 moves in a zigzag pattern, as seen from above, within the shift hole 406. In FIG. 10, circles formed by solid lines or two-dot-chain lines indicate particular positions of the shift lever 404. Characters and numbers within the circles indicate shift ranges at respective positions. Arrows A through G which are indicated by the solid lines and which connect the circles indicate a locus of movement of the shift lever 404.

As shown in FIG. 10, in a case in which an automatic transmission is set to a parking range (which hereinafter is simply referred to as the "P range") in which driving wheels of the vehicle are locked, the shift lever 404 is positioned at a "P position" at which "P" is shown within the circle. When the setting of the automatic transmission is changed from the P range to a reverse range (which hereinafter is simply referred to as the "R range") in which the driving wheels of the vehicle are rotated in reverse, the shift lever 404 is zigzag-moved along the arrow A shown in FIG. 10 to an "R position" at which "R" is shown within the circle. When the setting of the automatic transmission is changed from the R range to a neutral range (which hereinafter is simply referred to as the "N range") in which the driving wheels of the vehicle become free, the shift lever 404 is moved along the arrow B shown in FIG. 10 to an "N position" at which "N" is shown within the circle. As described above, when the setting of the automatic transmission is changed to a drive range (which hereinafter is simply referred to as the "D range") in which the driving wheels of the vehicle are rotated forward, a 4 range, a 3 range, a 2 range and a low range (which hereinafter is simply referred to as the "L range") in which ranges the driving wheels of the vehicle are rotated forward in transmission modes different from that of the D range, the shift lever 404 is moved along the arrows C, D, E, F and G to a "D position", a "4 position", a "3 position", a "2 position" and an "L position" at which positions characters corresponding to respective ranges are shown within the circles.

In the gate-type shift lever device 400 with the above-described structure, a mechanical microswitch 408 is provided at a back surface side of the housing 402. Movements of the shift lever 404 between the D position and the 4 position are detected by the microswitch 408. Further, another microswitch 410 is provided at the back surface side of the housing 402. Movements of the shift lever 404 between the 2 position and the L position are detected by the microswitch 410.

However, providing the microswiches 408 and 410 may cause a high manufacturing cost. The above-described shift lever device 400 needs to be further improved.

SUMMARY OF THE INVENTION

In view of the aforementioned facts, an object of the present invention is to provide a gate-type shift lever device with an inexpensive manufacturing cost.

In accordance with a first aspect of the present invention, there is provided a shift lever device including a shift lever operable along first and second directions which are perpendicular to each other, the shift lever device switching shift ranges set in a transmission by operations of the shift lever, the operations including a first operation in which the shift lever is moved in the second direction from a predetermined position along the first direction and a second operation in which the shift lever is moved in a direction opposite to the direction of the first operation from a position which is displaced along the first direction from the predetermined position, and the shift lever device including: a movement body axially supported to be rotatable about a third direction which is perpendicular to both the first direction and the second direction, the movement body having a first abutting portion which abuts the shift lever at a second direction side of the shift lever during the first operation, the movement body being rotated from an initial position to a first detection position by pressing force from the shift lever abutting the first abutting portion, the movement body having a second abutting portion which abuts the shift lever at a side thereof opposite the second direction side during the second operation, and the movement body being rotated to a second detection position, which is at a side of the initial position opposite from the first detection position, by pressing force from the shift lever abutting the second abutting portion; and a detector which detects presence of the movement body at the initial position, at the first detection position and at the second detection position.

In the shift lever device with the above-described structure, the shift range of the transmission of the vehicle is switched to a shift range corresponding to the position of the shift lever (shift position) by moving (shift-operating) the shift lever in the first and second directions, which are perpendicular to each other.

In the shift lever device of the present invention, when the shift lever is shift-operated from a predetermined position along the first direction to the second direction (that is, when the first operation is effected), the shift lever abuts the first abutting portion of the movement body and presses the first abutting portion in an operation direction thereof. The movement body receives pressing force from the shift lever at the first abutting portion and rotates in one direction about an axis whose direction is along a third direction, which is perpendicular to the first and the second directions, such that the movement body reaches, from the initial position, the first detection position. The movement of the movement body from the initial position to the first detection position is detected by the detector. Thus, it is detected that the first operation of the shift lever has been effected.

When the shift lever is shift-operated from a shift position along the first direction, which is different from the predetermined position of the first operation, along the second direction, specifically, in a direction opposite to the direction of the first operation (namely, when the second operation is effected), the shift lever abuts the second abutting portion of the movement body so as to press the second abutting portion in the operation direction thereof. The movement body receives pressing force from the shift lever at the second abutting portion and rotates in a direction opposite to the rotation direction of the first operation such that the movement body moves to the second detection position, which is different from the initial position and the first detection position. The movement of the movement body to the second detection position is detected by the detector. Thus, it is detected that the second operation of the shift lever has been effected.

As described above, in the shift lever device of the present invention, whether or not the first operation is effected and whether or not the second operation is effected can be detected by one movement body and one detector. Thus costs for manufacturing and supplying parts can be reduced.

In the present invention, the first direction and the second direction may be linear directions, respectively. Also, the first direction may be a direction of rotation about an axis whose direction is along the second direction. Moreover, the second direction may be a direction of rotation about an axis whose direction is along the first direction.

In accordance with the first aspect of the present invention, preferably, the shift lever device further includes a base mounted to a vehicle, which base supports the shift lever and axially supports the movement body substantially at a transverse direction center of the vehicle, wherein the movement body has the form of a plate whose thickness direction is along the third direction.

In the shift lever device with the above-described structure, the shift lever and the movement body are supported by the base. Here, the vehicle (automobile) includes so-called right-hand drive cars in which a steering device is provided at the right-hand side with respect to the vehicle transverse direction center and so-called left-hand drive cars in which the steering device is provided at the left-hand side with respect to the vehicle transverse direction center. If the second direction, which is a direction of pivot of the shift lever, is substantially the vehicle longitudinal direction, in most cases, the pivot directions of the first and the second operations of the shift lever in a right-hand drive car are opposite to the same in a left-hand drive car.

The movement body of the shift lever device of the present invention is supported at a central portion of the base along the first direction. If the movement body is turned over before being disposed on the base, positions of the first and second abutting portions are reversed with respect to an imaginary center line passing through the central portion of the base along the first direction. Thus, in a case in which the shift operation directions of the shift lever of the right-hand drive car are the reverse of the shift operation directions of the shift lever of the left-hand drive car with respect to the imaginary center line, the movement body can be reversed, the movement body can be used in either car, which contributes to a manufacturing cost reduction.

In accordance with a second aspect of the present invention, there is provided A device for selecting shift ranges in a transmission in a vehicle, the device including a shift lever having opposite ends with one end connectable to the vehicle and at least the other end movable relative to the vehicle in a first direction and a second direction substantially perpendicular to the first direction, with operations of the shift lever selecting transmission shift ranges in the vehicle transmission, the operations including a first operation in which the shift lever is moved in the second direction from a position along the first direction; and a second operation in which the shift lever is moved opposite the second direction from a position spaced from said first direction; and a movement body axially supported along a third direction substantially perpendicular to both the first and second directions, and rotatable to an initial position, a first detection position, and a second detection position, with the first and second detection positions at opposite sides of the initial position, the movement body having first and second abutting portions, the first abutting portion abutting the shift lever at a second direction side of the shift lever during the first operation, which subjects the first abutting portion to pressing force and causes the movement body to rotate from the initial position to the first detection position, the second abutting portion abutting the shift lever at a side opposite said second direction side during the second operation, which subjects the second abutting portion to pressing force and causes the movement body to rotate to the second detection position; and a detector which detects whether the movement body has been rotated to the initial position, the first detection position, and the second detection position.

In accordance with a third aspect of the present invention, there is provided a method for receiving shift range selections for a vehicle transmission via a shift lever device, wherein the shift lever device includes a shift lever movable by a user for selecting a shift range, the method comprising the steps of (a) movably mounting a movement body at a position wherein shift lever movements abut the movement body, resulting in different positions of the movement body according to shift lever movements; (b) detecting the position of the movement body; and (c) interpreting the detected position of the movement body as a shift range selection.

DESCRIPTION OF THE PREFERRED EMBODIMENTS

Figure 1:
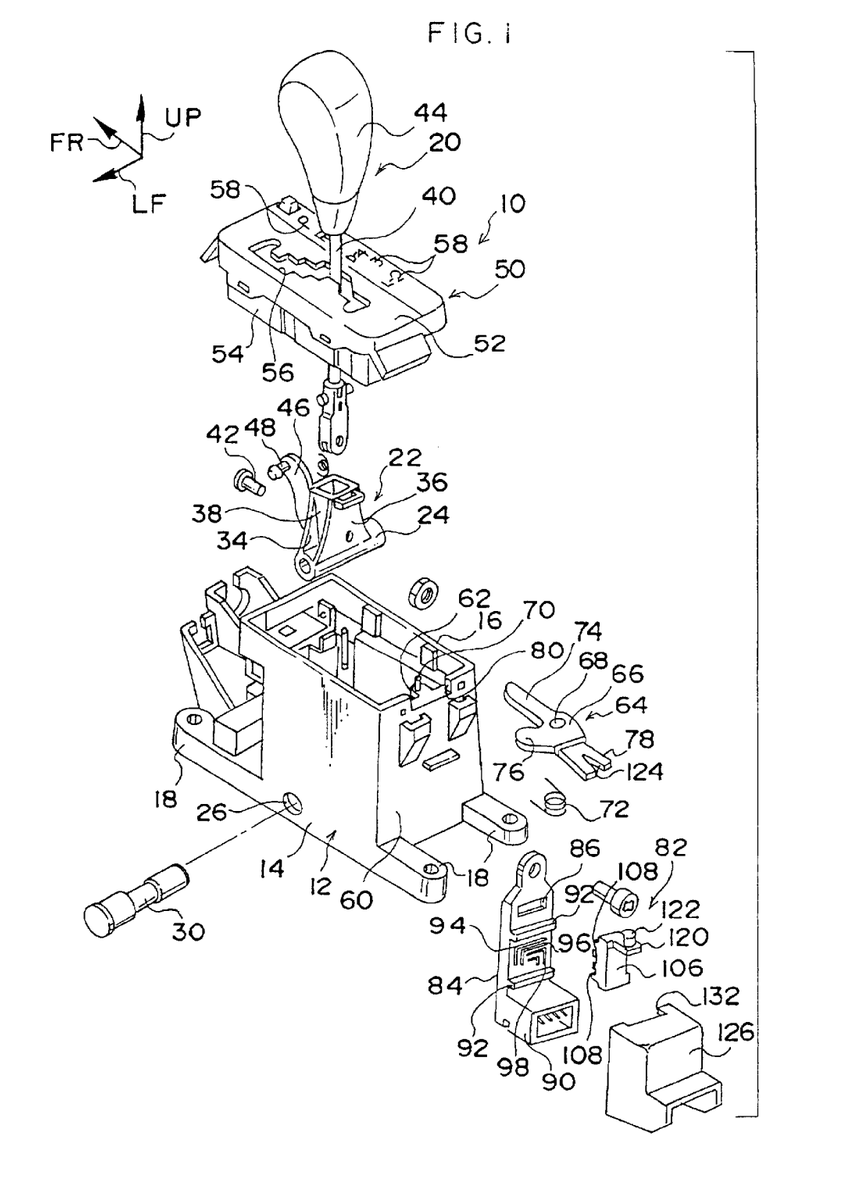
FIG. 1 is an exploded perspective view showing a structure of a main portion of a shift lever relating to an embodiment of the present invention.

FIG. 1 is an exploded view showing the overall structure of a shift lever device 10 relating to an embodiment of the present invention. In respective drawings including FIG. 1, the arrow FR indicates substantially the vehicle forward direction, which is a first direction, the arrow LF indicates substantially the vehicle left-hand direction (the direction opposite to the direction indicated by the arrow LF is substantially the vehicle right-hand direction, which is a second direction), and the arrow UP indicates substantially the vehicle upward-direction.

As shown in FIG. 1, the shift lever device 10 has a base 12. The base 12 has side wall portions 14 and 16 which oppose each other substantially in the vehicle transverse direction (i.e., the direction indicated by the arrow LF and the direction opposite to the direction indicated by the arrow LF in FIG. 1). The base 12 is formed in a substantial box shape such that substantially the vehicle upward side thereof (i.e., the side thereof in the direction indicated by the arrow UP in FIG. 1) is open. A plurality of fixing portions 18 formed at four corner portions of a lower end portion of the base 12 are fixed in a vicinity of a floor portion between a driver's seat and a front passenger's seat of a vehicle by fastening devices (not shown) such as bolts which pass through the fixing portions 18.

A retainer 22 which forms a shift lever 20 is disposed between the side wall portions 14 and 16 of the base 12. The retainer 22 has a cylinder portion 24 which has a through-hole which passes through substantially along the vehicle transverse direction. The cylinder portion 24 is disposed coaxially with respect to circular holes 26 formed at the side wall portions 14 and 16 (only the circular hole 26 that is at the side of the side wall portion 14 is shown in FIG. 1). In this state, a shaft control 30 serving as an axial member passes through the circular holes 26 and the cylinder portion 24. In this way, the retainer 22 is axially supported so as to be pivotable in a predetermined range with an axial direction being substantially the vehicle transverse direction.

A supporting portion 38 which has vertical walls 34 and 36 which oppose each other substantially in the vehicle longitudinal direction is integrally formed at the cylinder portion 24 of the retainer 22. A lower end portion of a bar-shaped lever main body 40 is positioned between the vertical walls 34 and 36 of the supporting portion 38. The lever main body 40 also forms the shift lever 20 together with the retainer 22. The longitudinal direction of the lever main body 40 is substantially along the vehicle vertical direction (i.e., the direction indicated by the arrow UP and the direction opposite to the direction indicated by the arrow UP in FIG. 1). A through-hole which is substantially along the vehicle longitudinal direction is formed at the lower end portion of the lever main body 40. The through-hole at the lower end portion of the lever main body 40 is disposed coaxially with respect to through-holes coaxially formed at the vertical walls 34 and 36 substantially along the vehicle longitudinal direction. In this state, a pin shaft 42 passes through the through-holes. In this way, the lever main body 40 is axially supported with respect to the retainer 22 so as to be pivotable in a predetermined range with an axial direction being substantially the vehicle longitudinal direction.

A knob 44 for griping which also forms the shift lever 20 together with the retainer 22 and the lever main body 40 is screwed onto an upper end portion of the lever main body 40. If a vehicle occupant grips the knob 44 and pushes or pulls the knob 44 substantially in the vehicle transverse direction, the lever main body 40 pivots transversely about the pin shaft 42 with the axial direction being substantially the vehicle longitudinal direction. Further, if the vehicle occupant pushes or pulls the knob 44 substantially in the vehicle longitudinal direction or the vehicle transverse direction, the lever main body 40 presses the vertical walls 34 and 36 of the retainer 22. As a result, the lever main body 40, together with the retainer 22, pivots longitudinally about the shaft control 30 with the axial direction being substantially the vehicle transverse direction.

An anchoring piece 46 is extended from the vertical wall 34 of the retainer 22 toward the side thereof opposite to the side at which the vertical wall 36 is formed (i.e., substantially toward the vehicle forward direction). One end of a wire (not shown) is anchored to an anchoring pin 48 formed at the anchoring piece 46. The other end of the wire is connected in a mechanical manner directly or indirectly to an automatic transmission or a controller which controls the automatic transmission. In accordance with pivoting of the retainer 22, the wire operates the automatic transmission or the controller that controls the automatic transmission.

A housing 50 is disposed substantially at the vehicle upward side of the above-described base 12. The housing 50 includes an upper housing 52 which is formed in a box shape and is open substantially toward the vehicle downward side (i.e., toward the direction opposite to the direction indicated by the arrow UP in FIG. 1) and a lower housing 54 which is provided under the upper housing 52.

A shift hole 56 which winds substantially in the vehicle longitudinal direction and in the vehicle transverse direction is formed at an upper face portion of the upper housing 52. The above-described lever main body 40 passes through the shift hole 56 so as to be pivotable along the shift hole 56.

Characters 58 such as "P", "R" and "N" and the like are formed to be arranged substantially in the vehicle longitudinal direction. These characters 58 indicate a plurality of shift ranges set in the automatic transmission of the vehicle (not shown). "P" indicates a parking range (which hereinafter is simply referred to as a "P range") in which driving wheels of the vehicle are locked. "R" indicates a reverse range (which hereinafter is simply referred to as an "R range") in which the driving wheels of the vehicle are driven in reverse. "N" indicates a neutral range (which hereinafter is simply referred to as an "N range") in which transmission of driving force to the vehicle is cut off and the driving wheels can rotate freely. "D" represents a drive range (which hereinafter is simply referred to as a "D range") in which the driving wheels of the vehicle are rotated forward. "4" to the right of the character "D" indicates a 4 range in which although the driving wheels are rotated forward as in the D range, the driving wheels are rotated forward in a transmission mode different from that of the D range. "3", "2" and "L", to the left of the character "2" indicate a 3 range, a 2 range and a low range (which hereinafter is simply referred to as an "L range") respectively, in which ranges, although the driving wheels are driven forward as in the D range, transmission modes thereof are different from that of the D range.

In the shift lever device 10 of the present invention, when the lever main body 40 which passes through the shift hole 56 is positioned beside one of these characters 58, the shift range of the automatic transmission is switched to a shift range corresponding to the character 58. FIGS. 2 through 5 show relationships between positions of the lever main body 40 within the shift hole 56 and the above-described shift ranges. FIGS. 2 through 5 will be briefly explained hereinafter. Circles formed by solid lines and imaginary lines (two-dot-chain lines) indicate the lever main body 40. Characters shown within the circles, such as P, R, N and the like, indicate that when the lever main body 40 is positioned at one of the circles, the shift range is switched to the shift range corresponding to the character. In the following explanation, positions of the lever main body 40 (shift positions) corresponding to respective shift ranges are, for convenience, simply denoted by corresponding characters and referred to as the "P position", the "N position", the "D position", the "4 position", the "3 position", the "2 position" and the "L position", respectively. Arrows A through G, connecting between centers of the circles which indicate the lever main body 40 at respective shift positions, indicate a locus of movement of the lever main body 40 (i.e., the shift lever 20) in a shift operation from the P range to the L range.

A tongue-shaped mounting piece 62 is extended from an upper end portion of a back wall portion 60 formed at the base 12 substantially toward the vehicle forward direction. A plate switch 64 serving as a movement body is placed on the mounting piece 62. As shown in FIGS. 2 through 5, the plate switch 64 has a plate-shaped base portion 66. A circular hole 68 is formed at the base portion 66 so as to pass through in the thickness direction thereof. Corresponding to the circular hole 68, a substantially cylindrical pin 70, whose axis crosses an imaginary center line passing centrally between the side wall portions 14 and 16, is formed so as to protrude from the above-described mounting piece 62 substantially in the vehicle upward direction. The pin 70 passes through the circular hole 68 such that the base portion 66 (the plate switch 64) is axially and rotatably supported about the pin 70 with the axial direction being substantially the vehicle vertical direction.

A torsion coil spring 72 is provided in a vicinity of the pin 70. The torsion coil spring 72 is placed on the mounting piece 62 such that the pin 70 is inserted into a coil portion thereof. One end of the torsion coil spring 72 is anchored to the base portion 66. The other end thereof is anchored on the mounting piece 62. Urging force of the torsion coil spring 72 acts to return the plate switch 64 to an original position after rotation about the pin 70.

A lever 74 serving as a first abutting portion is extended from the base portion 66 of the plate switch 64 substantially in the vehicle forward direction. The lever 74 is formed in a plate shape similarly to the base portion 66 and a longitudinal direction thereof is substantially along the vehicle longitudinal direction (The longitudinal direction of the lever 74 changes depending on a rotation position of the base portion 66). A distal end side of the lever 74 is extended substantially in the vehicle forward direction further than the characters 58 "D-4" formed on the upper face portion of the upper housing 52. When the lever main body 40 is positioned at the left-hand side of the characters 58 "D-4", the lever main body 40 opposes the transverse direction left-hand side of a distal portion of the lever 74 substantially in the vehicle transverse direction.

A lever 76 serving as a second abutting portion is extended from the base portion 66 in a direction angled substantially toward the vehicle left-hand direction with respect to the vehicle forward direction (The longitudinal direction of the lever 76 changes depending on the rotation position of the base portion 66). A distal end side of the lever 76 is extended substantially in the vehicle forward direction further than the characters 58 "L-2" formed on the upper face portion of the upper housing 52, but does not reach the characters 58 "D-4". A distance between the lever 76 and the lever 74 is larger than an outer diameter of the lever main body 40, thus the lever main body 40 can enter between the lever 74 and the lever 76.

An operation portion 78 is extended from the side of the base portion 66 opposite to the side from which the levers 74 and 76 extend. The operation portion 78 is also formed in a plate shape like the levers 74 and 76. A distal end side of the operation portion 78 is extended substantially in the vehicle rearward direction further than the back wall portion 60 via a notch portion 80 formed at the back wall portion 60.

Figure 6:
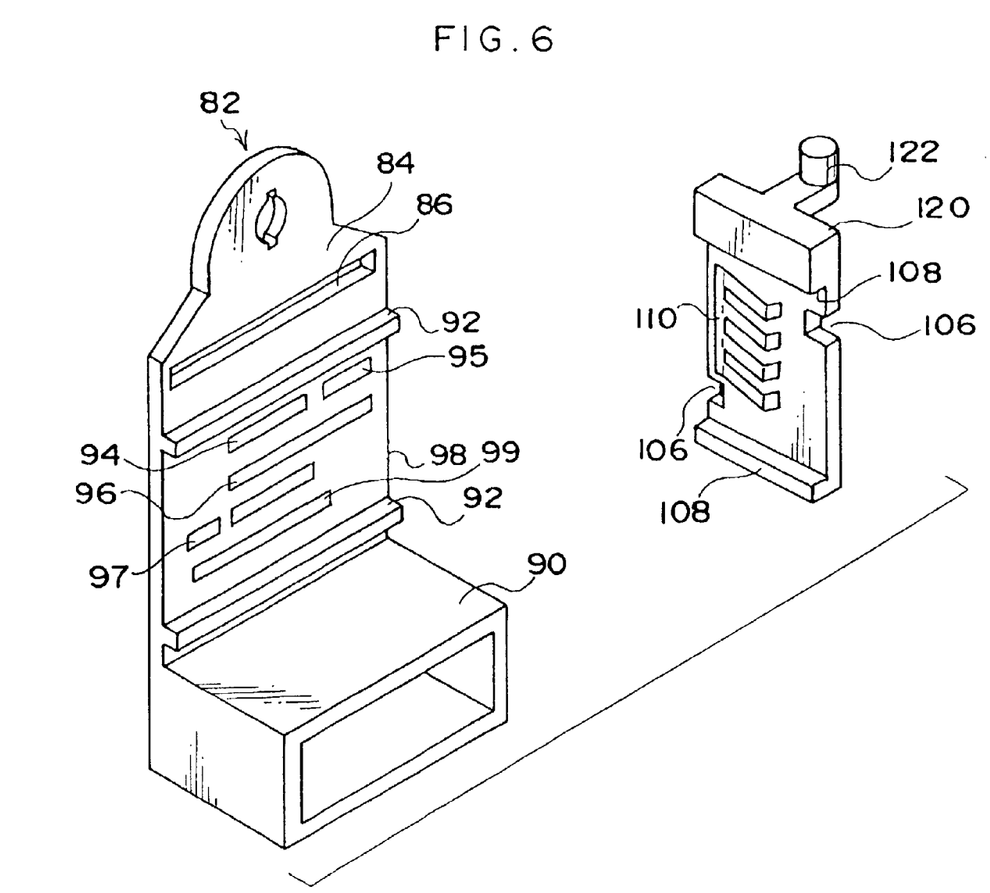
FIG. 6 is an exploded perspective view showing a structure of a detector (a switch).

As shown in FIG. 1, a switch 82 serving as a detector is mounted to the back wall portion 60. As shown in FIG. 6, the switch 82 has an insulator 84 which is mounted to the back wall portion 60 (see FIG. 1). The insulator 84 is formed in a plate shape whose longitudinal direction is substantially the vehicle vertical direction and whose transverse direction is substantially the vehicle transverse direction. A box-shaped connector portion 90 which opens substantially in the vehicle rearward direction is formed at a lower end portion of the insulator 84. A plurality of connecting terminals are provided within the connector portion 90. A connector (not shown) is mechanically connected to the connector portion 90.

A pair of guide rails 92 is formed at one main surface of the insulator 84 above the connector portion 90. The longitudinal direction of each guide rail 92 is along the transverse direction of the insulator 84. The guide rails 92 are parallel to each other. Further, a plurality of fixed contacts 94, 95, 96, 97, 98 and 99 are formed between the guide rails 92. The fixed contacts 94 through 99 are connected to the connecting terminals of the connector portion 90 through the interior of the insulator 84 or along the other main surface thereof.

A substantially rectangular through-hole 86 is formed at an upper end side of the insulator 84 and has a longitudinal direction along the transverse direction of the insulator 84. The above-described operation portion 78 of the plate switch 64 passes through the through-hole 86 substantially from the vehicle forward side (i.e., from the other surface side of the insulator 84) so as to protrude substantially in the vehicle rearward direction further than the insulator 84.

A holder contact 106 is disposed substantially at the vehicle rearward side of the above-described insulator 84. The holder contact 106 is a plate-shaped member whose longitudinal direction is substantially the vehicle vertical direction and whose transverse direction is substantially the vehicle transverse direction. Wall portions 108 are formed at substantial vehicle vertical direction end portions of the holder contact 106 so as to correspond to the above-described pair of guide rails 92. The wall portions 108 are supported by the guide rails 92. Thus the holder contact 106 is supported by the insulator 84 so as to be slidable along the guide rails 92 substantially in the vehicle transverse direction.

A slide contact 110 formed of a conductive material such as a metal material or the like is provided between wall portions 108 of the holder contact 106. The slide contact 110 is formed so as to correspond to the above-described fixed contacts 94 through 99. Which of the fixed contacts 94 through 99 the slide contact 110 slide-contacts depends on the position along the substantial vehicle transverse direction of the holder contact 106 with respect to the insulator 84.

A tongue-shaped engaging piece 120 is extended from an upper end portion of the holder contact 106 substantially toward the vehicle rearward side. An engaging pin 122 is formed to protrude from the engaging piece 120 substantially toward the vehicle upward direction. A notch portion 124 which is open substantially toward the vehicle rearward side is formed in the above-described operation portion 78 of the plate switch 64 so as to correspond to the engaging pin 122. The engaging pin 122 enters the notch portion 124.

The holder contact 106 is covered by a cover 126 (FIG. 1). The cover 126 is formed in a box shape so as to open substantially toward the vehicle forward side. The cover 126 can be integrally mounted to the back wall portion 60. Further, the cover 126 can be integrally mounted to the insulator 84 before being mounted to the back wall portion 60. That is, in the present embodiment, the insulator 84, the holder contact 106 and the cover 126 which form the switch 82 are one unit. The insulator 84, the holder contact 106 and the cover 126 are assembled together, and then this assembly is mounted to the back wall portion 60 of the base 12. A notch portion 132 is formed at the cover 126 and the above-described engaging pin 122 passes though the notch portion 132.

Next, shift operation of the shift lever 20 in the shift lever device 10 will be explained. On the basis of this explanation, operation and effects of the present embodiment will be explained with reference to FIGS. 2 through 5.

Figure 2:
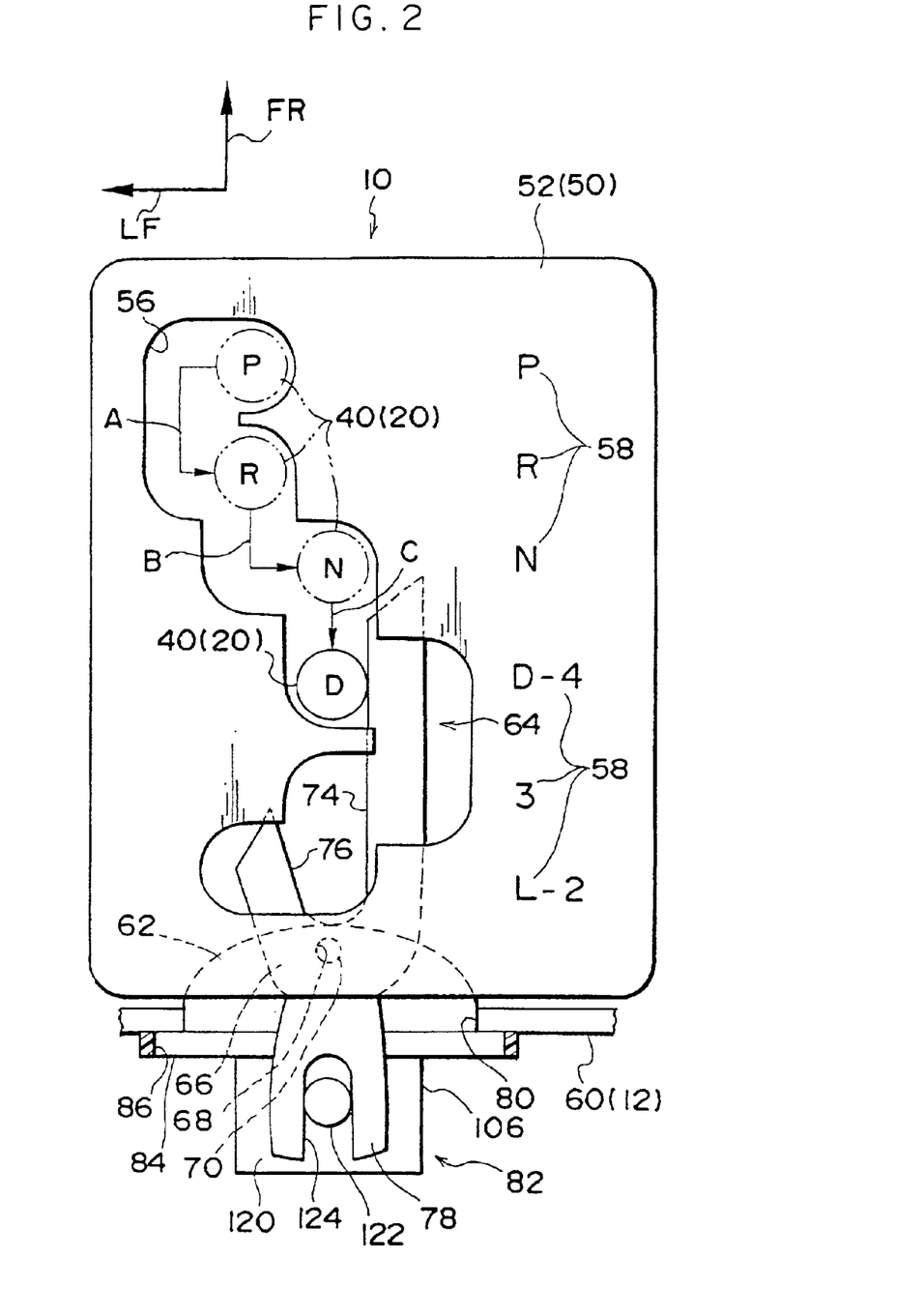
FIG. 2 is a schematic plan view (showing a state in which the shift lever is positioned at a D position).

As shown in FIG. 2, in the shift lever device 10 of the present invention, when the automatic transmission of the vehicle is in the P range, the lever main body 40 of the shift lever 20 is in the P position which is in a vicinity of a substantial vehicle forward direction end portion of the shift hole 56 (the direction indicated by the arrow FR in FIG. 2) and substantially toward the vehicle right-hand side (the direction opposite to the direction indicated by the arrow LF in FIG. 2).

From this state, the lever main body 40 is pivoted about the pin shaft 42 substantially in the vehicle left-hand direction (the direction indicated by the arrow LF in FIG. 2) and then is pivoted about the shaft control 30 substantially in the vehicle rearward direction (the direction opposite to the direction indicated by the arrow FR in FIG. 2). Then, the lever main body 40 is pivoted about the pin shaft 42 substantially in the vehicle right-hand direction. That is, the lever main body 40 is moved from the P position to the R position along the arrow A in FIG. 2. As a result, the shift range of the automatic transmission is switched to the R range.

Next, from the R range, the lever main body 40 is pivoted about the shaft control 30 substantially in the vehicle rearward direction and then is pivoted about the pin shaft 42 substantially in the vehicle right-hand direction. That is, the lever main body 40 is moved from the R position to the N position along the arrow B in FIG. 2, and the shift range of the automatic transmission is switched to the N range.

Hereinafter, as described above, the lever main body 40 is pivoted about the pin shaft 42 and the shaft control 30 along the shift hole 56 (i.e., along the arrows C through G) so as to be moved to the D position, the 4 position, the 3 position, the 2 position and the L position. Accordingly, the shift range of the automatic transmission is switched to shift ranges corresponding to the characters shown within the circles.

Figure 3:
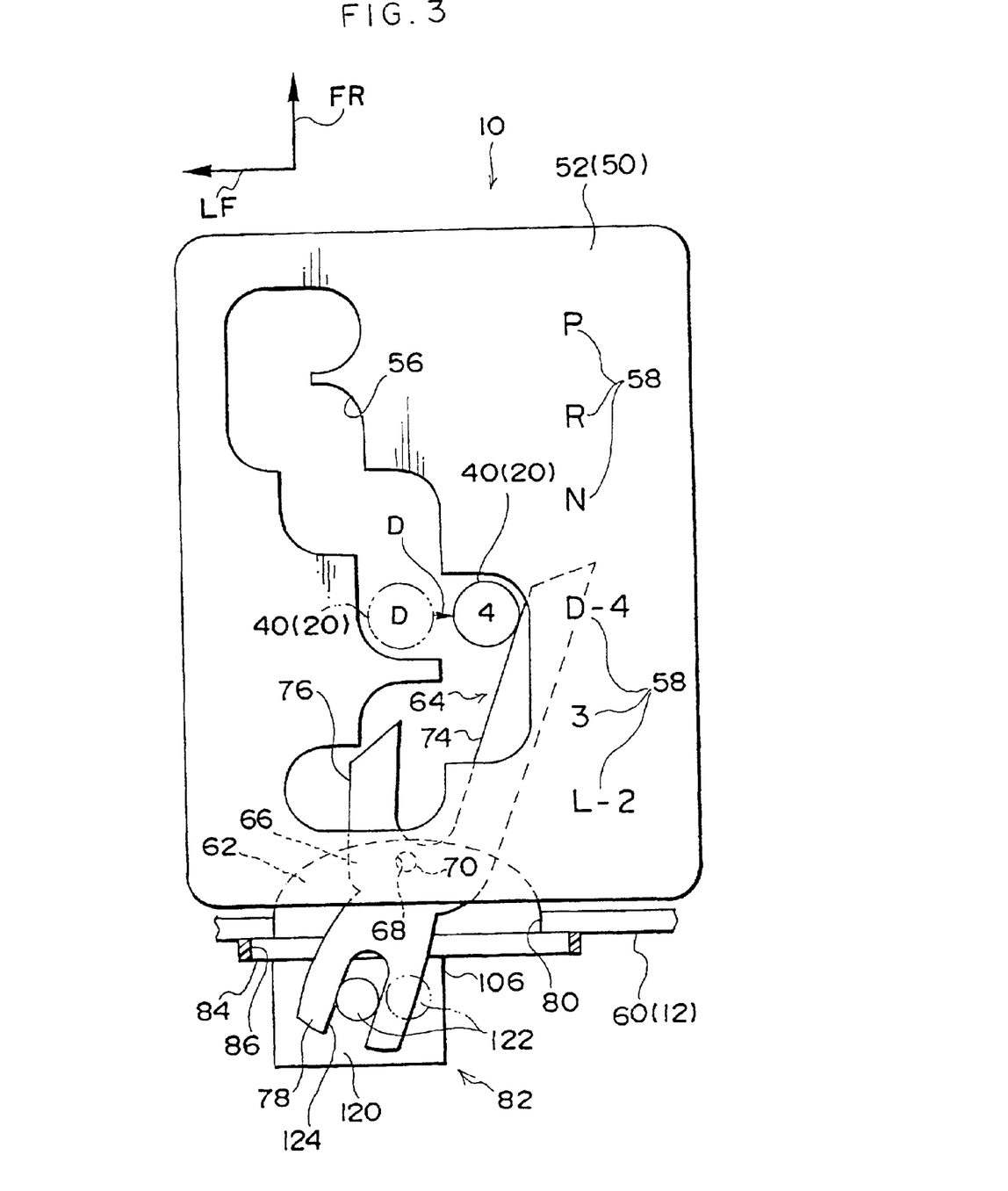
FIG. 3 is a schematic plan view(showing a state in which the shift lever is positioned at a 4 position).

As shown in FIG. 2, from a state in which the lever main body 40 is positioned at the D position, if the lever main body 40 is moved toward the 4 position in the direction indicated by the arrow D in FIG. 3 (i.e., if the first operation is effected), as shown in FIG. 2, the lever main body 40 abuts the lever 74 of the plate switch 64 during movement.

If the lever main body 40 is further moved to the 4 position, the lever main body 40 presses the lever 74 substantially in the vehicle right-hand direction. Due to this pressing force, the plate switch 64 is rotated about the pin 70 from an initial position shown in FIG. 2 to a first detection position shown in FIG. 3. When the lever 74 is rotated substantially in the vehicle right-hand direction, the operation portion 78 which is positioned at the opposite side of the pin 70 with respect to the lever 74 is rotated substantially in the vehicle left-hand direction. An inner side portion of the notch 124 formed at the operation portion 78 presses the engaging pin 122 substantially in the vehicle left-hand direction.

Figure 8:
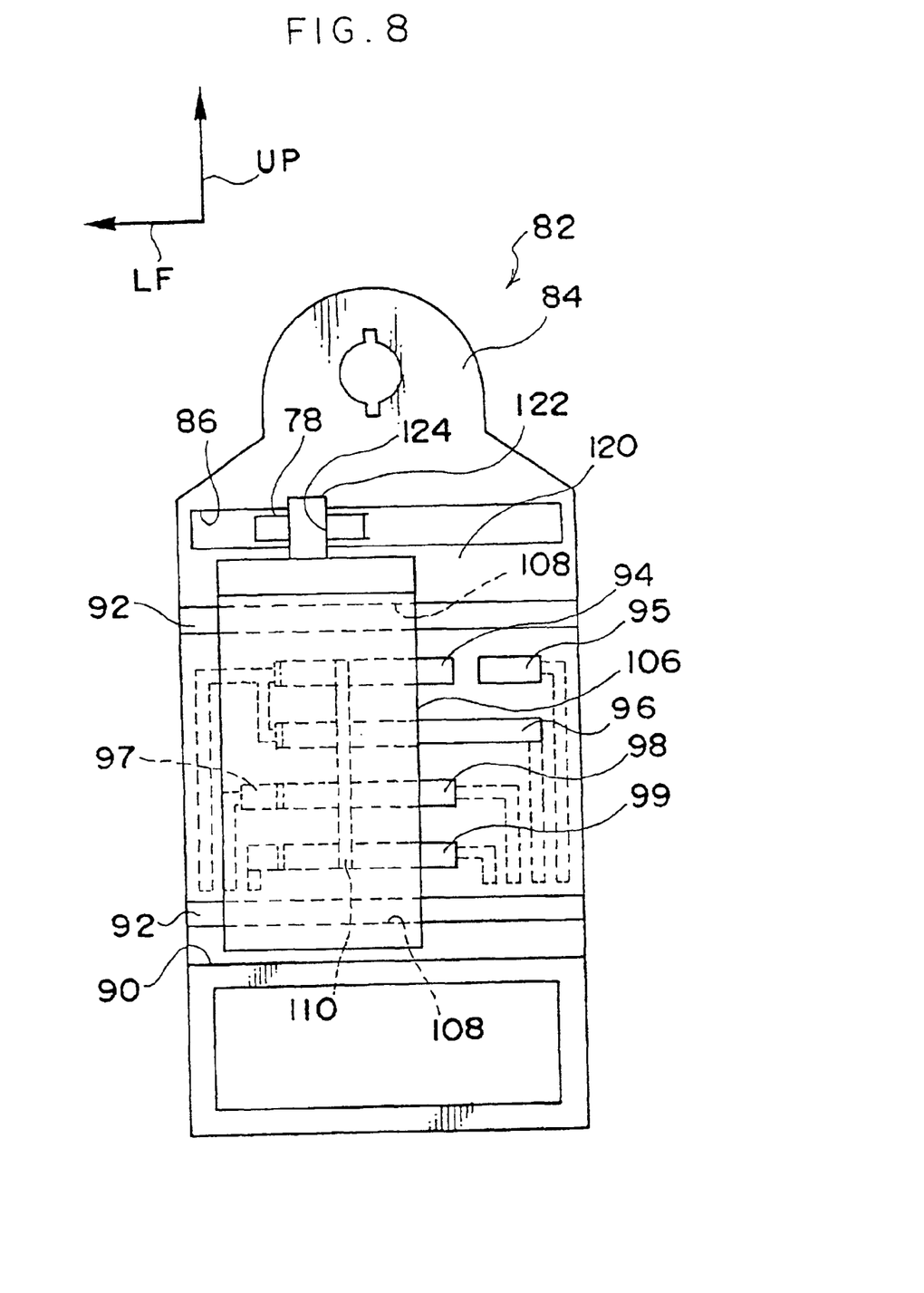
FIG. 8 is a schematic front view of the switch showing a state of the detector (the switch) when the movement body is positioned at a first detection position.

The engaging pin 122 receives the pressing force and the holder contact 106 slides along the guide rails 92 substantially in the vehicle left-hand direction. The slide contact 110 slide-contacts the fixed contacts 97 and 99 and conducts therebetween (FIG. 8). A controller (not shown) which is electrically connected via the connector portion 90 to the fixed contacts 94 through 99, such as a computer, a control circuit or the like, detects that the fixed contacts 97 and 99 are electrically conductive. Thus, it is detected that that the lever main body 40 has moved to the 4 position. Then, the shift range of the automatic transmission is switched from the D range to the 4 range.

Figure 7:
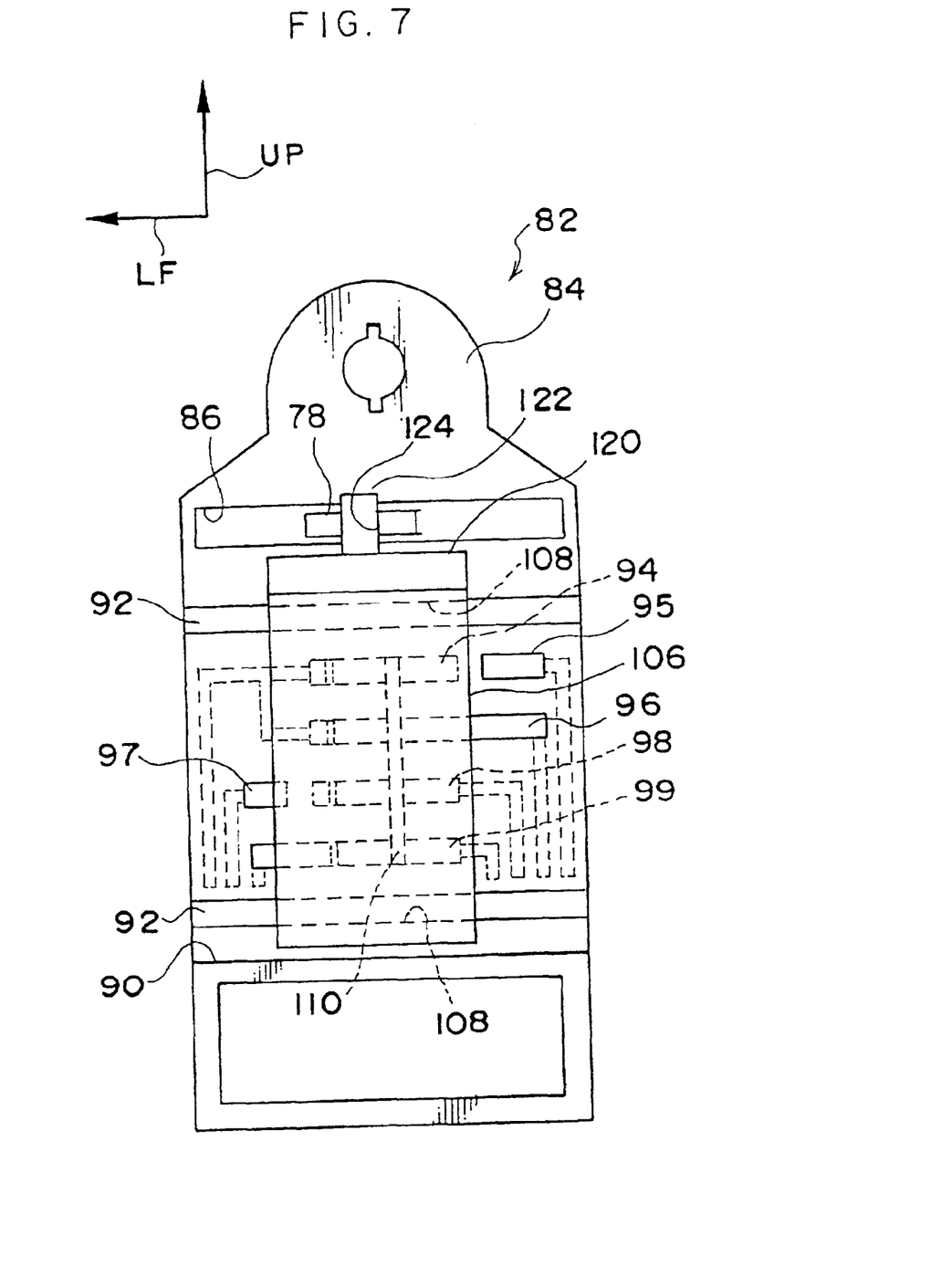
FIG. 7 is a schematic front view of the switch showing a state of the detector (the switch) when a movement body is positioned at an initial position.

Conversely, if the lever main body 40 is moved from the 4 position to the D position, in the direction opposite to the direction indicated by the arrow D in FIG. 2, the plate switch 64 is returned to its original position, that is, to the initial position shown in FIG. 2, by the urging force of the torsion coil spring 72. Accordingly, as shown in FIG. 7, the plate switch 64 and the holder contact 106 move in the direction opposite to the direction mentioned above, so that the slide contact 110 conducts between the fixed contacts 94, 96, 98 and 99. When the controller (not shown ) detects that the slide contact 110 is conducting between the fixed contacts 94, 96, 98 and 99, it is detected that the lever main body 40 has moved to the D position. Then, the shift range of the automatic transmission is switched from the 4 range to the D range.

Figure 4:
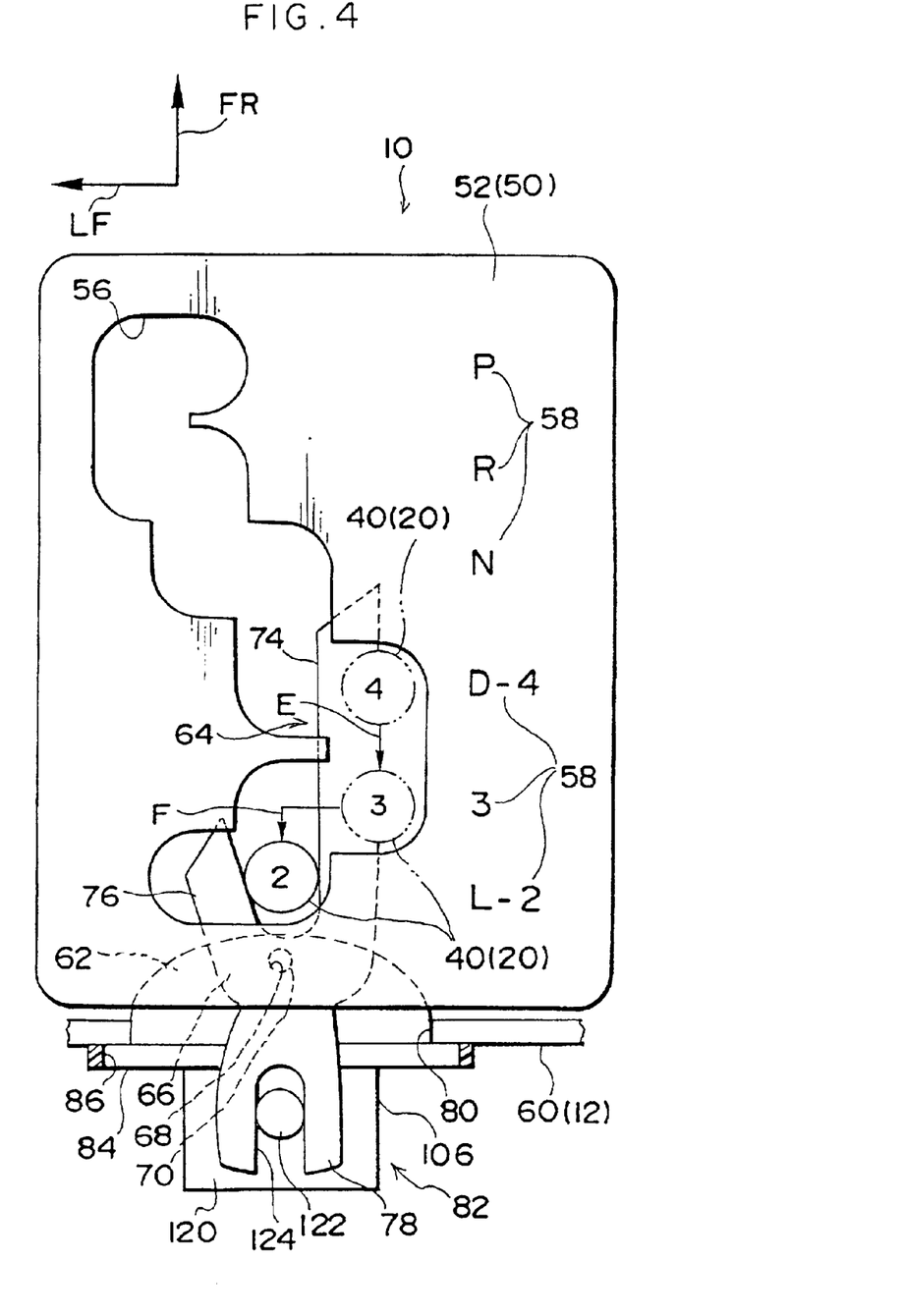
FIG. 4 is a schematic plan view(showing a state in which the shift lever is positioned at a 2 position).
Figure 5:
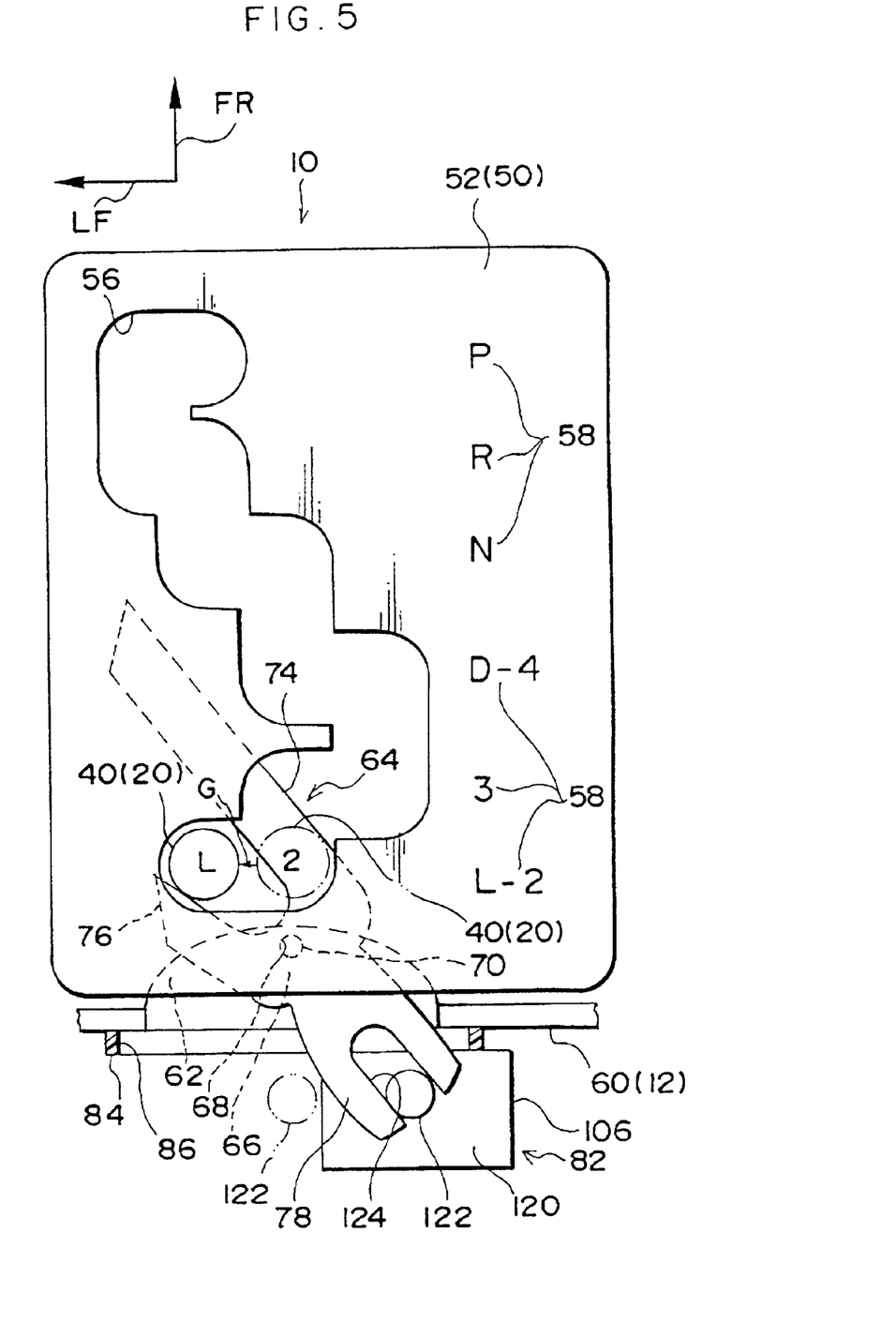
FIG. 5 is a schematic plan view(showing a state in which the shift lever is positioned at an L position).

As shown in FIG. 4, if the lever main body 40 is moved from the 2 position toward the L position, in the direction indicated by the arrow G in FIG. 5 (i.e., if a second operation is effected), as shown in FIG. 4, the lever main body 40 abuts the lever 76 of the plate switch 64 during movement.

If the lever main body 40 is further moved to the L position, the lever main body 40 presses the lever 76 substantially in the vehicle left-hand direction (in the direction indicated by the arrow LF in FIG. 4). Due to this pressing force, the plate switch 64 is rotated about the pin 70 from the initial position to a second detection position shown in FIG. 5. The lever 74 is rotated substantially in the vehicle left-hand direction and the operation portion 78 which is positioned at the opposite side of the pin 70 with respect to the lever 74 is rotated substantially in the vehicle right-hand direction (in the direction opposite to the direction indicated by the arrow LF in FIG. 5). The inner side portion of the notch portion 124 formed at the operation portion 78 presses the engaging pin 122 substantially in the vehicle right-hand direction.

Figure 9:
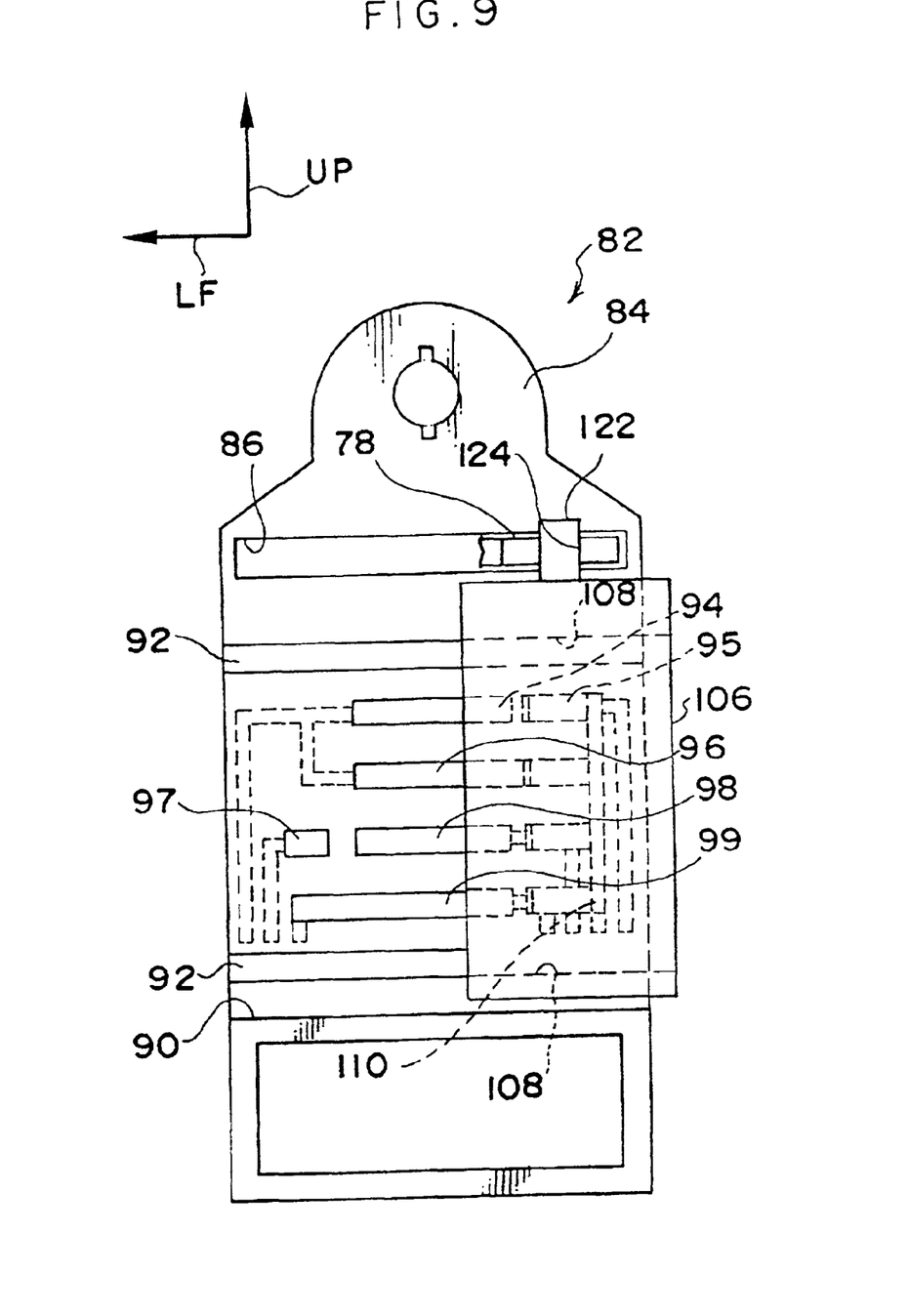
FIG. 9 is a schematic front view of the switch showing a state of the detector (the switch) when the movement body is positioned at a second detection position.

By the engaging pin 122 receiving the pressing force, the holder contact 106 is slid along the guide rails 92 substantially in the vehicle right-hand direction (in the direction opposite to the direction indicated by the arrow LF in FIG. 5). As shown in FIG. 9, the slide contact 110 slide-contacts the fixed contacts 95 and 96 and conducts therebetween. The controller (not shown) detects that the slide contact 110 has slide-contacted the fixed contacts 95 and 96 and is conducting therebetween. Thus, it is detected that the lever main body 40 has moved to the L position. The shift range of the automatic transmission is switched from the 2 range to the L range.

Conversely, if the lever main body 40 is moved from the L position to the 2 position in the direction opposite to the direction indicated by the arrow G in FIG. 5, the plate switch 64 is returned to its original position, i.e., to the initial position shown in FIG. 4, by the urging force of the torsion coil spring 72. Accordingly, as shown in FIG. 7, the plate switch 64 and the holder contact 106 move in the direction opposite to the above-mentioned direction, so that the slide contact 110 conducts between the fixed contacts 94, 96, 98 and 99. When the controller (not shown) detects that the slide contact 110 is conducting between the fixed contacts 94, 96, 98 and 99, it is detected that the lever main body 40 has moved to the 2 position. Thus, the shift range of the automatic transmission is switched from the L range to the 2 range.

The fixed contacts 94, 96, 98 and 99 conduct both in cases in which the shift lever 20 is positioned at the 4 position and in which the shift lever 20 is positioned at the 2 position. The pivot position of the shift lever 20 about the shaft control 30 in the case in which the shift lever 20 is positioned at the 4 position is different from that in the case in which the shift lever 20 is positioned at the 2 position. Accordingly, whether the shift lever 20 is positioned at the 4 position or at the 2 position is detected depending on a displacement amount of the wire (not shown) anchored to the anchoring pin 48 of the anchoring piece 46 shown in FIG. 1.

In the present embodiment, the movements of the shift lever 20 (the lever main body 40) between the D position and the 4 position and between the 2 position and the L position can be detected by one plate switch 64 and one switch 82. Thus manufacturing costs can be inexpensive.

In the present embodiment, the plate switch 64 can be used by both a so-called right-hand drive car, in which a steering device is provided at the right-hand side with respect to the vehicle transverse direction center, and a so-called left-hand drive car, in which the steering device is provided at the left-hand side with respect to the vehicle transverse direction center, and thus the manufacturing costs can be made more inexpensive.

The basic structure of the shift lever device 10 of the right-hand drive car is the same as that of the left-hand drive car. Usually, in a case in which the shift ranges of an automatic transmission are switched by zigzag-moving a shift lever in the longitudinal direction and in the transverse direction as in the shift lever device 10, the shape of the shift hole 56 of the left-hand drive car is a mirror image of the shift hole 56 of the right-hand drive car, with respect to an imaginary center line passing through the vehicle transverse direction center. In the shift lever device 10 of the present invention, the pin 70 is formed on the imaginary center line passing through the vehicle transverse direction center and the plate switch 64 is axially supported by the pin 70. Thus if the plate switch 64 is inverted before being axially supported by the pin 70, the positions of the levers 74 and 76 are reversed with respect to the imaginary center line passing through the vehicle transverse direction center. And if the fixed contacts 94 through 99 of the insulator 84 are reversed from right to left, the plate switch 64 itself can be used without further modification, and the manufacturing costs can be inexpensive.

What is claimed is:

1. A shift lever device including a shift lever operable along first and second directions which are perpendicular to each other, said shift lever device switching shift ranges set in a transmission by operations of Mid shift lever, said operations including a first operation in which said shift lever is moved in said second direction from a predetermined position along said first direction and a second operation in which said shift lever is moved in a direction opposite to the direction of said first operation from a position which is displaced along said first direction from said predetermined position, and said shift lever device comprising:

a movement body axially supported to be rotatable about a third direction which is perpendicular to both said first direction and said second direction, said movement body having a first abutting portion which abuts said shift lever at a second direction side of said shift lever during said first operation, said movement body being rotated from an initial position to a first detection position by pressing force from said shift lever abutting said first abutting portion, said movement body having a second abutting portion which abuts said shift lever at a side thereof opposite said second direction side during said second operation, and said movement body being rotated to a second detection position, which is at a side of said initial position opposite from said first detection position, by pressing force from said shift lever abutting said second abutting portion; and a detector which detects presence of said movement body at said initial position, at said first detection position and at said second detection position, said detector including a slidable member adapted to slide to electrical connection positions corresponding to said first and second detection positions.

2. The shift lever device according to claim 1, further comprising a base mounted to a vehicle, which base supports said shift lever and axially supports said movement body substantially at a transverse direction center of said vehicle, wherein said movement body has the form of a plate whose thickness direction is along said third direction.

3. The shift lever device according to claim 1, further comprising a base mounted to a vehicle, which base supports said shift lever and axially supports said movement body substantially at a transverse direction center of said vehicle, wherein said movement body has the form of a block whose thickness direction is along said third direction.

4. The shift lever device according to claim 1, wherein said first detection position corresponds to a predetermined shift range, and said second detection position corresponds to another predetermined shift range.

5. The shift lever device according to claim 2, said detector comprising:
- a plate member which is mounted at a surface of paid base; and
- a box-shaped connector portion which is formed at a lower end of said plate member,
- wherein said plate member includes a pair of rails by which said slidable member is slidably supported via wall portions.

6. The shift lever device according to claim 3, wherein said detector further comprising:
- a plate member which is mounted at a surface of said base; and
- a box-shaped connector portion which is formed at a lower end of said plate member,
- wherein said plate member includes a pair of rails by which said slidable member is slidably supported via wall portions.

7. The shift lever device according to claim 5, wherein a plurality of fixed contacts is formed on said plate member between said pair of rails, and an electrical conduction path between said fixed contacts is connected to said connector portion.

8. The shift lever device according to claim 5, wherein said movement body includes a substantially V-shaped operation portion which extends in a direction opposite to a direction in which said first and second abutting members extend, which passes through a through-hole formed in said plate member, and which engages with said slidable member to enable sliding thereof.

9. The shift lever according to claim 6, wherein a plurality of fixed contacts is formed on said plate member between said pair of rails, and an electrical conduction path that is connected to said connector portion is completed by a combination of said fixed contacts.

10. The shift lever device according to claim 6, wherein said movement body includes a substantially V-shaped operation portion which extends in a direction opposite to a direction in which said first and second abutting members extend, which passes through a through-hole formed in said plate member, and which engages with said slidable member to enable sliding thereof.

11. A device for selecting shift ranges in a transmission in a vehicle, the device comprising:
- (a) a shift lever having opposite ends with one end connectable to the vehicle and at least the other end movable relative to the vehicle in a first direction and a second direction substantially perpendicular to the first direction, with operations of the shift lever selecting transmission shift ranges in the vehicle transmission, the operations including:
  - (i) a first operation in which the shift lever is moved in the second direction from a position along the first direction; and
  - (ii) a second operation in which the shift lever is moved opposite the second direction from a position spaced from said first direction; and
- (b) a movement body axially supported along a third direction substantially perpendicular to both the first and second directions, and rotatable to an initial position, a first detection position, and a second detection position, with the first and second detection positions at opposite sides of the initial position, the movement body having first and second abutting portions, the first abutting portion abutting the shift lever at a second direction side of the shift lever during the first operation, which subjects the first abutting portion to pressing force and causes the movement body to rotate from the initial position to the first detection position, the second abutting portion abutting the shift lever at a side opposite said second direction side during the second operation, which subjects the second abutting portion to pressing force and causes the movement body to rotate to the second detection position; and
- (c) a detector which detects whether the movement body has been rotated to the initial position, the first detection position, and the second detection position, said detector including a slidable member adapted to slide to electrical connection positions corresponding to said first and second detection position.

12. The device of claim 11, further comprising a base mountable to the vehicle, with the shift lever being connected to the vehicle via the base, and the base axially supporting the movement body substantially at a transverse direction center of the vehicle, wherein the movement body has a form in a plate-shape, with thickness of the plate-shape oriented along the third direction.

13. The device of claim 11, further comprising a base mountable to the vehicle, with the shift lever being connected to the vehicle via the base, and the base axially supporting the movement body substantially at a transverse direction center of the vehicle, wherein the movement body has a form in a block-shape, with a thickness of the block-shape oriented along the third direction.

14. The device of claim 11, wherein said first detection position corresponds to predetermined shift range, and said second detection position corresponds to another predetermined shift range.

15. The device of claim 12, wherein the detector includes:
- a plate member having an electrical connector, and a pair of rails;
- wherein the slidable member is movably slidable along the rails on the plate member to positions completing an electrical connection of the plate member.

16. The device of claim 12, wherein the detector includes:
- a plate member having an electrical connector, and a pair of rails;
- wherein the slidable member is movably slidable along the rails on the plate member to positions completing an electrical circuit on the plate member.

17. The device of claim 15, wherein a plurality of electrical contacts is formed on the plate member between the pair of rails, with the contacts electrically connected to the electrical connector.

18. The device of claim 15, wherein the plate member includes a through-hole and the movement body includes a substantially V-shaped operation portion extending in a direction opposite to a direction in which the first and second abutting members extend, and passing through the through-hole formed in said plate-shaped member, and engaging with the slidable member.

19. A device for use with a shift lever device in operating a transmission in a vehicle, wherein the shift lever device includes a housing having a surface at which a polygonal shift hole is formed, a base fixed to the vehicle and supporting the housing, and a shift lever supported by the base and movable along the shift hole, the device comprising:
- a movement body mountable to a surface of the base and axially supported thereby, the movement body including first and second abutting portions which cooperatively form with one another a configuration substantially corresponding to a V-shape, each abutment portion extending to an extent sufficient that the abutment portion is abutted by the shift lever when the shift lever is moved to at least one location along the shift hole; and a detector mountable adjacent the base, and operable for detecting at least two kinds of abutment of the shift lever against the movement body, the detector including an engaging portion, which engages with the movement body and a slidable member which slides to positions completing an electrical connection according to the kind of abutment.

20. The device of claim 19, wherein the slidable member includes at least one wall portion and the detector includes:

a plate member mountable to one surface of the base, and having a pair of rails on which the slidable member is slidably supported via the at least one wall portion; and a connector portion formed on the plate member.

21. The device of claim 19, wherein at least two kinds of abutment of the shift lever against the movement body correspond respectively to predetermined shift ranges.

22. The device of claim 20, wherein the plate member includes a through-hole, the engaging portion includes a pin, and the movement body includes an operation portion substantially corresponding to a V-shape, the operation portion extending in a direction opposite to a direction in which the first and second abutting members extend and passes through the though-hole in the plate member, and a surface of the operation portion presses the pin during movement of the movement body for enabling sliding of the slidable member.

23. The device of claim 20, wherein a plurality of electrical contacts is formed on the plate member between the pair of rails, with the contacts electrically connected to the connector portion.

24. The device of claim 23, wherein the slidable member includes at a surface at which the at least one wall portion is formed, a slide contact disposed in correspondence with the plurality of electrical contacts.

25. A method for receiving shift range selections for a vehicle transmission via a shift lever device, wherein the shift lever device includes a shift lever movable by a user for selecting a shift range, the method comprising the steps of:

(a) movably mounting a movement body at a position wherein shift lever movements abut the movement body, resulting in different positions of the movement body according to shift lever movements;

(b) detecting the position of the movement body using a detector including a slidable member adapted to slide to electrical connection positions; and (c) interpreting the detected position of the movement body as a shift range selection.

26. The method of claim 25, wherein the shift lever device includes a base, and the step of movably mounting a movement body, includes axially supporting the movement body on a surface of the base.

27. The method of claim 25, wherein the step of detecting the position of the movement body is performed by determining whether an electrical connection has been completed due to a position of the movement body.

28. The method of claim 27, wherein determining whether an electrical connection has been completed is performed by providing electrical contacts and a slider driven by the movement body, wherein slider movement electrically connects contacts to one another according to movement positions of the shift lever.

* * * * *